United States Patent [19]

Arai et al.

[11] Patent Number: 4,632,071
[45] Date of Patent: Dec. 30, 1986

[54] ENGINE BREATHER DEVICE FOR MOTOR VEHICLE WITH RIDING SADDLE

[75] Inventors: Shokichi Arai; Tadayoshi Fujii, both of Saitama, Japan

[73] Assignee: Honda Giken Kogyo Kabushiki Kaisha, Tokyo, Japan

[21] Appl. No.: 809,809

[22] Filed: Dec. 17, 1985

[30] Foreign Application Priority Data

Dec. 18, 1984 [JP] Japan .................... 59-192097[U]

[51] Int. Cl.$^4$ ............................................ F01M 13/00
[52] U.S. Cl. ................................... 123/41.86; 180/311
[58] Field of Search ................. 123/41.86, 572, 573, 123/574; 180/311, 312

[56] References Cited

U.S. PATENT DOCUMENTS 3,945,463  3/1976  Okano .................... 180/311
4,535,869  8/1945  Tsutsumikoshi .

FOREIGN PATENT DOCUMENTS 56-132418  10/1981  Japan .................... 180/311
59-39711   3/1984   Japan .................... 123/41.86

Primary Examiner—Ronald B. Cox
Attorney, Agent, or Firm—Armstrong, Nikaido, Marmelstein & Kubovcik

[57] ABSTRACT

An engine breather device in a motor vehicle having a vehicle frame including longitudinal upper and lower frames, front and rear wheels rotatably supported on the vehicle frame, a handlebar mounted on the vehicle frame for steering the front wheels, a rider's saddle disposed on an upper portion of the vehicle frame, footsteps disposed on a lower portion of the vehicle frame. The engine breather device comprises a substantially vertical pipe frame adapted to interconnect the upper and lower frames and having at least one opening, an engine adapted to be mounted on the vehicle frame and having a crankcase and a cylinder projecting upwardly from the crankcase, the cylinder having a hole extending from the upper end thereof into the crankcase, and a breather tube providing communication between the interior of the vertical pipe frame and the interior of the crankcase through the hole in the cylinder, the breather tube being connected to the engine at a first position above the upper end of the cylinder and to the vertical pipe frame at a second position lower than the first position. Since the engine breather tube employs the existing vertical pipe frame, it is made up of a reduced number of parts and simple in construction. The breather tube prevents water from entering the engine therethrough even when the engine is substantially fully immersed in a deep puddle.

5 Claims, 4 Drawing Figures

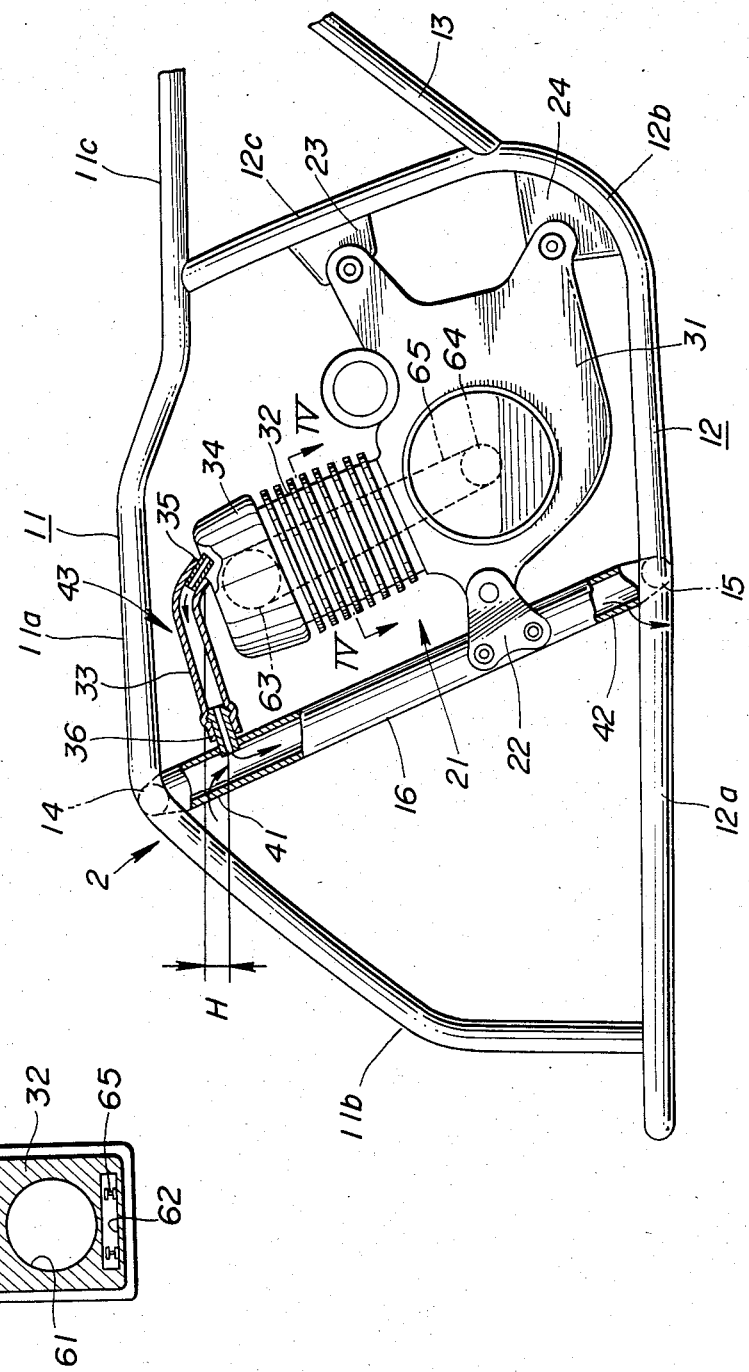

ENGINE BREATHER DEVICE FOR MOTOR VEHICLE WITH RIDING SADDLE

BACKGROUND OF THE INVENTION

The present invention relates to an engine breather device for use in a motor vehicle with a riding saddle, for example, a motor vehicle designed for running over rough terrain.

There is known an engine breather device for use in a motor vehicle with a riding saddle, the engine breather device comprising an engine including a crankcase and a cylinder projecting upwardly from the crankcase, a vehicle frame on which the engine is mounted, the vehicle frame including a substantially vertically extending pipe frame having openings defined in upper and lower portions thereof, and a breather tube connected between an intermediate portion of the vertical pipe frame and the engine. Such a known engine breather device is disclosed in Japanese Laid-Open Utility Model Publication No. 59(1984)-39711. This conventional engine breather is advantageous in that the number of parts required is reduced and the entire structure is simple since the device utilizes the existing vertical pipe frame.

The motor vehicle with a riding saddle is used normally to travel over rough terrain including puddles. Therefore, the engine is supposed to be immersed at least partly in such puddles while the motor vehicle is running. In the prior engine breather device, the breather tube is connected to the engine at a position on an upper portion of the crankcase, and also connected to the vertical pipe frame at a position above the aforesaid position. Consequently, the engine is allowed to be immersed in puddles only up to the upper portion of the crankcase.

SUMMARY OF THE INVENTION

It is an object of the present invention to provide an engine breather device for use in motor vehicles with riding saddles which is made up of a reduced number of parts and simple in construction, and which permits the motor vehicle to run in deep puddles in which the engines are immersed substantially in their entirety.

According to the present invention, there is provided an engine breather device in a motor vehicle having a vehicle frame including longitudinal upper and lower frames, front and rear wheels rotatably supported on the vehicle frame, a handlebar mounted on the vehicle frame for steering the front wheels, a rider's saddle disposed on an upper portion of the vehicle frame, footsteps disposed on a lower portion of the vehicle frame, the engine breather device comprising a substantially vertical pipe frame adapted to interconnect the upper and lower frames and having at least one opening, an engine adapted to be mounted on the vehicle frame and having a crankcase and a cylinder projecting upwardly from the crankcase, the cylinder having a hole extending from the upper end thereof into the crankcase, and a breather tube providing communication between the interior of the vertical pipe frame and the interior of the crankcase through the hole in the cylinder, the breather tube being connected to the engine at a first position above the upper end of the cylinder and to the vertical pipe frame at a second position lower than the first position. Since the engine breather tube employs the existing vertical pipe frame, it is made up of a reduced number of parts and simple in construction. The breather tube prevents water from entering the engine therethrough even when the engine is substantially fully immersed in a deep puddle.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a side elevational view, partly cut away, of an engine breather device; and FIG. 4 is a cross-sectional view taken along line IV—IV of FIG. 3.

DETAILED DESCRIPTION OF THE PREFERRED EMBODIMENT

The principles of the present invention are particularly useful when embodied in an engine breather device incorporated in a motor vehicle with a riding saddle.

Figure 1:
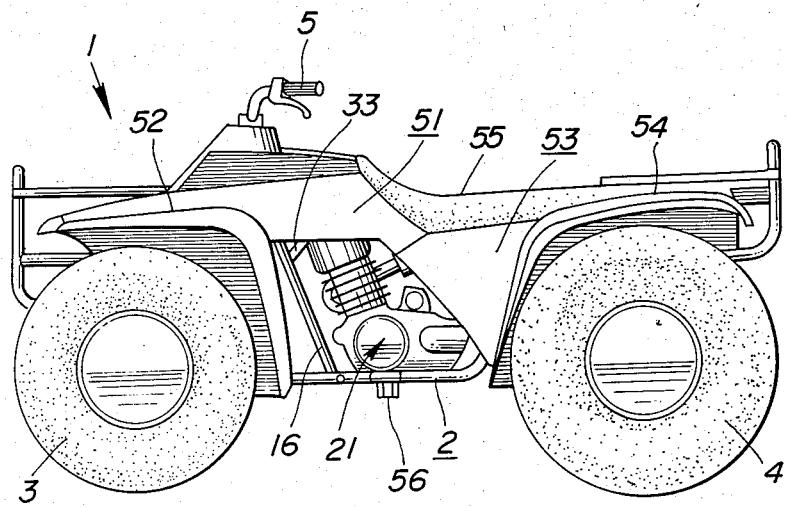
FIG. 1 is a side elevational view of a motor vehicle with a riding saddle.
Figure 2:
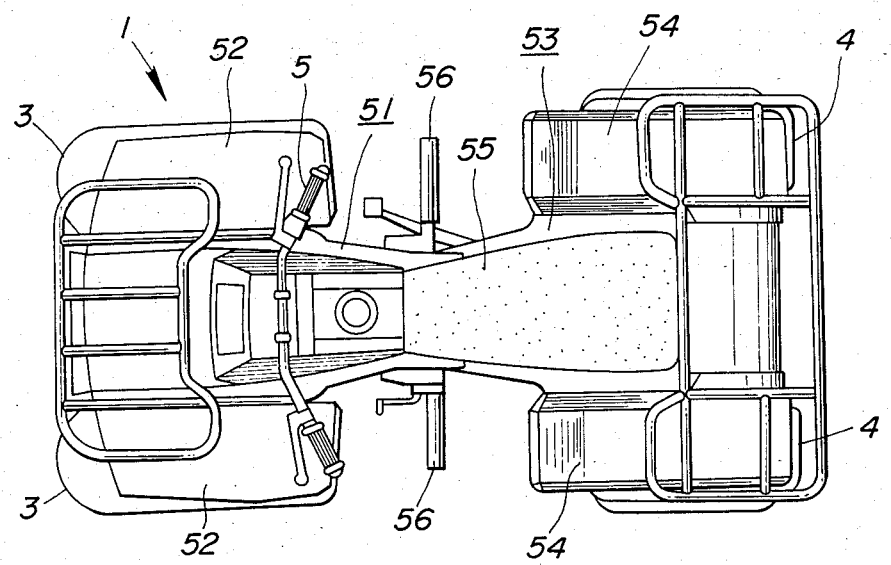
FIG. 2 is a plan view of the motor vehicle shown in FIG. 1.

As shown in FIGS. 1 and 2, a four-wheeled motor vehicle 1 with a riding saddle has a vehicle frame 2 on which two front wheels 3, 3 and two rear wheels 4, 4 are rotatably mounted, the front wheels 3, 3 being steerable by a handlebar 5. Each of the front and rear wheels 3, 4 has a balloon tire.

As shown in FIG. 3, the vehicle frame 2 comprises a pair of upper frames 11 (only one shown) which are spaced transversely and extend longitudinally and a pair of lower frames 12 (ony one shown) which are spaced transversely and extend longitudinally.

Each of the upper frames 11 comprises a longitudinal main pipe 11a, and down pipe 11b extending obliquely downwardly from the front portion of the main pipe 11a, and a seat pipe 11c extending rearwardly from the rear portion of the main pipe 11a.

Each of the lower frames 12 comprises a longitudinal lower pipe 12a and a central pipe 12c extending upwardly from the rear end of the lower pipe 12a through a bent pipe portion 12b. The down pipe 11b has a lower end welded to the front portion of the lower pipe 12a. The central pipe 12c has an upper end welded to the front portion of the seat pipe 11c. A rear stay 13 extends between an intermediate portion of the seat pipe 11c and a lower portion of the central pipe 12c.

Two vertically spaced cross members 14, 15 are coupled respectively between the upper frames 11 and between the lower frames 12. The cross member 14 interconnects the front portions of the main pipes 11a, and the cross member 15 interconnects intermediate portions of the lower pipes 12a. A vertical pipe frame 16 extends between the cross members 14, 15 and is inclined in the forward direction of the vehicle frame 2.

An engine 21 is disposed in a space defined by the vertical pipe frame 16, the main pipes 11a, the central pipes 12c, and the lower pipes 12a, and mounted on the vertical pipe frame 16 by an engine hanger bracket 22, on the central pipes 12c by engine hanger brackets 23, and on the lower pipes 12a by engine hanger brackets 24. As shown in FIGS. 3 and 4, the engine 21 is of a 4-cycle OHC design including a crankcase 31 and a cylinder 32 projecting obliquely upwardly from a front portion of the crankcase 31. The cylinder 32 which is inclined in the forward direction of the vehicle frame 2 has a bore 61 in which a piston (not shown) is slidably disposed and a hole 62 extending from the upper end of the cylinder 32 into the crankcase 31. In the hole 62, there is disposed a cam chain 65 trained around a sprocket 63 positioned in a valve chamber above the cylinder 32 and a sprocket 64 disposed in the crankcase 31.

The valve chamber above the cylinder 32 is connected to an upper portion of the vertical pipe frame 16 by a breather tube 33. In the illustrated embodiment, a head cover 34 is mounted on the upper end of the cylinder 32 and has a connector tube 35 mounted on an upper surface thereof and providing communication between the exterior and interior of the head cover 34, the interior of the head cover 34 communicating with the hole 62. The sprocket 63 is housed in the head cover 34 which defines the valve chamber. A connector tube 36 is mounted on the vertical pipe frame 16 at a position which is a distance H lower than the pipe 35, the connector tube 36 providing communication between the exterior and interior of the vertical pipe frame 16. The breather tube 33 has opposite ends connected to the connector tubes 35, 36 to provide communication between the interior of the head cover 34 and the interior of the vertical pipe frame 16. The breather tube 33 has an intermediate portion higher than the connector tube 35 to allow the engine 21 to have an increased height.

The vertical pipe frame 16 has openings 41, 42 defined in upper and lower portions thereof. The vertical pipe frame 16 and the breather tube 33 constitute a breather device 43 which communicates the interior of the crankcase 31 with the atmosphere through the hole 34 and the interior of the head cover 34.

As shown in FIGS. 1 and 2, the motor vehicle 1 also includes a front cover 51 having front fenders 52, 52, a rear cover 53 having rear fenders 54, 54, a rider's seat or saddle 55 on an upper portion of the vehicle frame 2, and footsteps 56 on a lower portion of the vehicle frame 2.

With the above arrangement of the present invention, the breather device 43 allows the engine 21 to breathe through the existing vertical pipe frame 16. The breather device 43 is therefore made up of a reduced number of parts and simple in construction. The breather tube 33 is connected to the engine 21 through the connector tube 35 positioned above the cylinder 32, and also connected to the vertical pipe frame 16 through the connector tube 36 lower than the pipe 35. Therefore, even when the engine 21 is immersed in a deep puddle and water gets into the vertical pipe frame 16, the water is prevented from entering the engine 21 through the breather tube 33.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. An engine breather device in a motor vehicle having a vehicle frame including longitudinal upper and lower frames, front and rear wheels rotatably supported on said vehicle frame, a handlebar mounted on said vehicle frame for steering said front wheels, a rider's saddle disposed on an upper portion of said vehicle frame, footsteps disposed on a lower portion of said vehicle frame, said engine breather device comprising:
   substantially vertical pipe frame adapted to interconnect said upper and lower frames and having at least one opening;
   an engine adapted to be mounted on said vehicle frame and having a crankcase and a cylinder projecting upwardly from said crankcase, said cylinder having a hole extending from the upper end thereof into said crankcase;
   a breather tube providing communication between the interior of said vertical pipe frame and the interior of said crankcase through said hole in said cylinder; and
   said breather tube being connected to said engine at a first position above the upper end of said cylinder and to said vehicle pipe frame at a second position lower than said first position.

2. An engine breather device according to claim 1, including head cover mounted on the upper end of said cylinder and having a first connector tube at said first position, said vertical pipe frame having a second connector tube at said second position, said breather tube having opposite ends connected to said first and second connector tubes, respectively.

3. An engine breather device according to claim 1, wherein said breather tube has an intermediate portion higher than said first position.

4. An engine breather device according to claim 1, wherein each of said lower frames comprises a lower pipe extending longitudinally of said vehicle frame, a central pipe extending upwardly and fixed to one of said upper frames, and a bent portion interconnecting ends of said lower and central pipes, said vertical pipe frame being disposed in front of said engine, said engine being adapted to be disposed in front of said central pipe, said engine being fixedly supported on said vertical pipe frame by an engine hanger bracket and adapted to be fixedly supported on said central pipe by an engine hanger bracket.

5. An engine breather device according to claim 1, wherein said cylinder and said vertical pipe frame are inclined in the forward direction of the vehicle frame.

* * * * *